United States Patent [19]

Collurafici et al.

[11] 4,440,431

[45] Apr. 3, 1984

[54] HANDLE AND FASTENING APPARATUS

[75] Inventors: Francisco A. Collurafici, Baltimore; Ralph L. Lee, Rockville, both of Md.

[73] Assignee: Fairchild Industries, Inc., Germantown, Md.

[21] Appl. No.: 225,681

[22] Filed: Jan. 16, 1981

[51] Int. Cl.[3] .............................................. A47J 45/00

[52] U.S. Cl. .................................... 294/27 H; 16/115

[58] Field of Search ............... 294/27 H, 34, 153, 158; 16/115; 312/244; 220/96, 94 R; 190/55 R, 57, 58 B; 70/208, 210, 215

[56] References Cited

U.S. PATENT DOCUMENTS

| | | | |
|---|---|---|---|
| 2,667,058 | 1/1954 | Skuglund | 70/215 |
| 2,677,261 | 5/1954 | Jacobi | 70/210 |
| 3,988,802 | 11/1976 | Bruni et al. | 16/115 |
| 4,299,313 | 11/1981 | Null | 16/115 |

FOREIGN PATENT DOCUMENTS

| | | | |
|---|---|---|---|
| 729425 | 12/1942 | Fed. Rep. of Germany | 70/208 |

*Primary Examiner*—James B. Marbert
*Attorney, Agent, or Firm*—Michael W. York

[57] ABSTRACT

Handle and fastening apparatus which includes a housing and a handle. The handle has an outer end portion and an inner end portion, and the inner end portion of the handle is rotatably connected to the housing to permit the handle to be pivoted from a stowed position to an operative extended position. The outer end portion of the handle has an L-shaped configuration, and a fastener is connected to one of the legs of the L-shaped outer end portion. Both the handle and the fastener are suitably sized and shaped so that they do not protrude above the plane of the front surface of the housing when the handle is located in the stowed position. The handle and fastening apparatus is particularly suited for securing electronic equipment to racks and the like.

5 Claims, 6 Drawing Figures

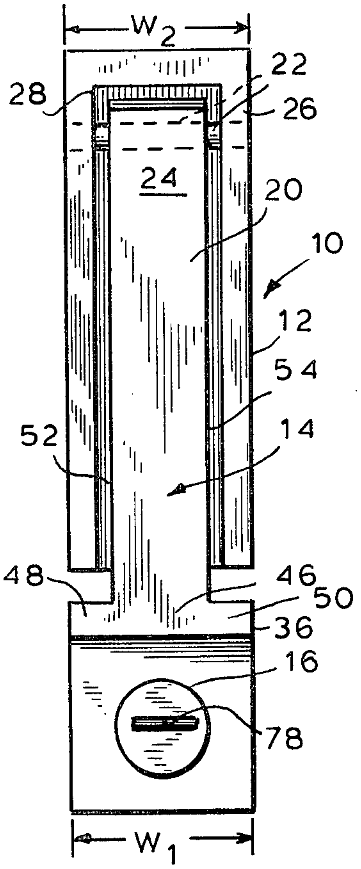
Fig. 1
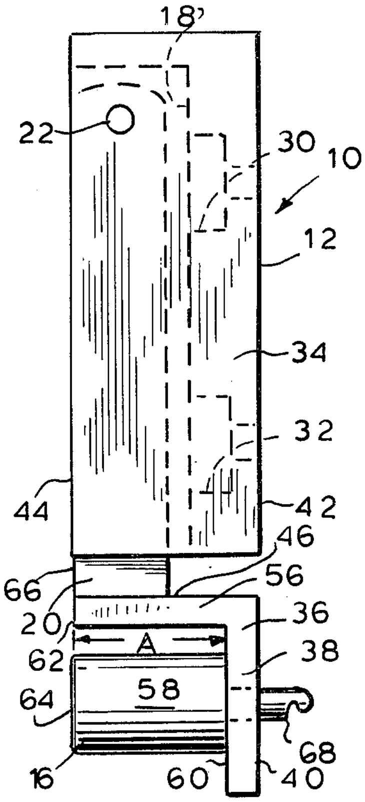
Fig. 2
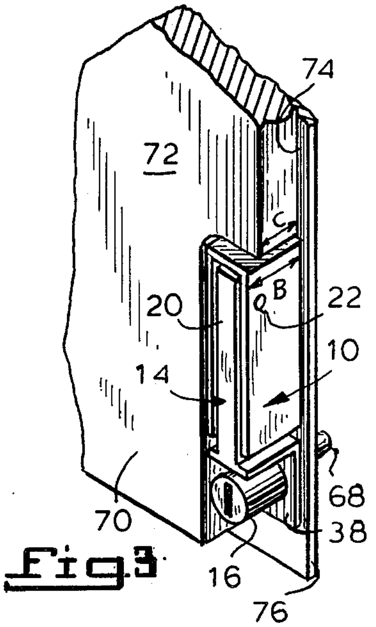
Fig. 3
Fig. 5
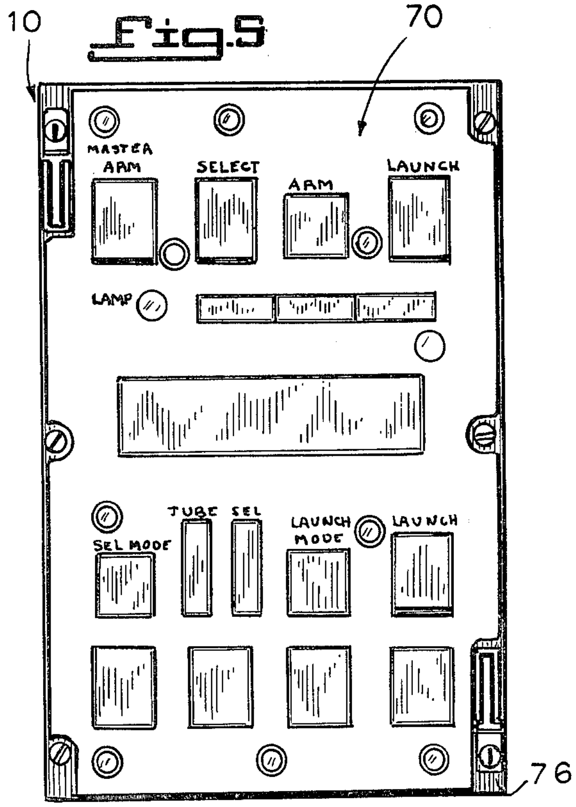
Fig. 6
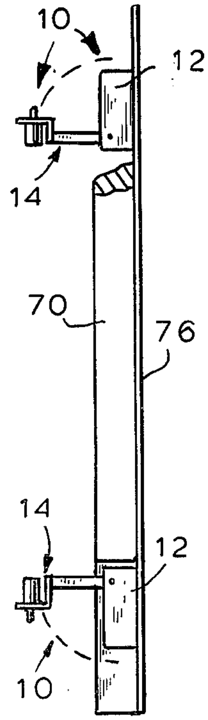
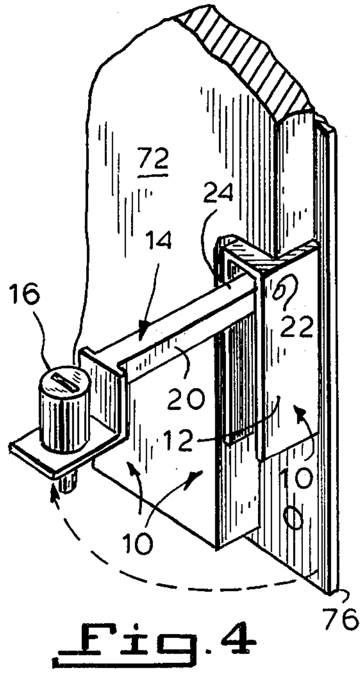
Fig. 4

HANDLE AND FASTENING APPARATUS

BACKGROUND OF THE INVENTION

In numerous instances it is desirable to have handles that can be utilized to move apparatus that do not protrude from the apparatus. In this connection, currently commercial and military electronic equipment that is rack or console mounted lacks handles that can be utilized to remove the equipment when it is necessary to replace or repair such equipment. The lack of such handles is due in part to the fact that they would normally protrude from the equipment and hence tend to interfere with the movement of individuals around such equipment. Moreover, handles that protruded from the equipment would constitute a safety hazard and could adversely affect the overall packaging envelope. In view of the fact that such equipment currently lacks handles, screwdrivers or the like are usually utilized to attempt to pry the equipment outward so that it can be grasped by hand. In addition, in some instances knobs or other similar projections are pulled in an attempt to remove the equipment, and this can result in damage to such knobs or other similar projections.

Consequently, a need definitely exists for some type of handle that will not protrude from equipment such as commercial and military electronic equipment that is rack or console mounted but can be readily utilized as a handle for removing the equipment when it is necessary to repair or replace such equipment. The current invention provides such a handle which in its stowed position does not protrude from the equipment but when it is desired to be utilized can be swung outward in its operative position to provide a handle that can be easily grasped by an individual's hand and utilized to remove the equipment for replacement or repair. The present invention also has provisions for being utilized to assist in securing the electronic equipment to the console or rack.

SUMMARY OF THE INVENTION

This invention relates to handle and fastening apparatus, and more particularly to handle and fastening apparatus which does not project from associated equipment when it is in its stowed position.

Accordingly, it is an object of the present invention to provide handle and fastening apparatus which does not present a safety hazard.

It is another object of the present invention to provide handle and fastening apparatus which is readily usable in a confined space.

It is an object of the invention to provide handle and fastening apparatus which can be utilized to secure an attached apparatus and also as a handle to remove the apparatus.

It is an object of the present invention to provide handle and fastening apparatus with a handle that does not project when it is in its stowed position but has a handle that projects outward when it is in its unstowed position.

It is another object of the present invention to provide handle and fastening apparatus which is particularly useful in securing commercial and military electronic equipment to a rack or console.

The foregoing and other objects are obtained by the present invention by providing handle and fastening apparatus which includes a housing and a handle which has an outer end portion and an inner end portion. The inner end portion of the handle is pivotally connected to the housing to permit the handle to be pivoted from a stowed position to an operative extended position, and fastener means are located on the outer end portion of the handle.

BRIEF DESCRIPTION OF THE DRAWINGS

In order that the invention will be more clearly set forth and better understood, reference is made to the accompanying drawings in which:

FIG. 1 is a front elevational view of the handle and fastening apparatus of the invention;

FIG. 2 is a side elevational view of the structure set forth in FIG. 1;

FIG. 3 is a perspective view of the handle and fastening apparatus in use connecting electronic equipment to a portion of the electronic equipment console;

FIG. 4 is a perspective view of the handle and fastening apparatus and associated electronic equipment and electronic console set forth in FIG. 3 with the handle of the handle and fastening apparatus in its extended or operative position;

FIG. 5 is a front elevational view of the front panel of electronic equipment illustrating the location of the handle and fastening apparatus; and FIG. 6 is a side elevational view of the structure set forth in FIG. 5, with a portion broken away, illustrating the handles of the handle and fastening apparatus in their extended or operative positions.

DETAILED DESCRIPTION OF THE PREFERRED EMBODIMENT

Referring first to FIGS. 1 and 2, the handle and fastening apparatus is designated generally by the number 10. It will be noted that the handle and fastening apparatus 10 comprises a housing 12, a handle 14, and fastening means comprising the fastener 16 located on the outer end portion of the handle. The housing 12 has a rectangular well 18 which is sized and shaped to receive a rectangular shaped cross section portion 20 of the handle 14. The handle 14 is rotatably connected to the housing 12 by means of a roll pin 22 which extends through an aperture in the inner end portion 24 of the handle 14 and through apertures located in the adjacent walls 26 and 28 of the housing 12.

As illustrated in FIG. 2, countersunk apertures 20 and 32 extend through the well bottom portion 34 of the housing 12. These apertures 30 and 32 are utilized to secure the handle and fastening apparatus 10 to suitable items such as electronic equipment through the use of screws or the like that can be inserted into the apertures 30 and 32 when the handle 14 is in its raised or extended positions.

As illustrated in FIGS. 1 and 2 it will be noted that the outer end portion 36 of the handle 14 is generally L-shaped and that the leg portion 38 has its inner surface 40 substantially located in the plane of the inner wall 42 of the housing member 12. This leg portion 38 also has the fastener 16 of the fastening means connected to it. As best illustrated in FIG. 2, this in conjunction with the size of the outer end portion 36 of the handle and the size of the fastener member 16 is to reduce or eliminate any protrusion of the fastener member 16 and the outer end portion 36 of the handle 14 above the plane of the outer surface 44 when the handle 14 is in its inoperative or stowed position. As illustrated in FIG. 1, the other leg 46 of the L-shaped outer end portion 36 has portions 48 and 50 which extend or protrude outwardly from the respective sides 52 and 54 of the rectangular shaped cross section portion 20 of the handle 14. It will also be noted as illustrated in FIG. 2 that the leg 46 has a portion 56 which extends or protrudes below the rectangular shaped cross section portion 120 of the handle 14. The purpose of these projecting or protruding portions 48, 50 and 56 is to provide protrusions that can be grasped by the hands of an individual when the handle and fastening apparatus 10 has its handle rotated outwardly in the operative position as will hereinafter be more fully described. It should be noted that the width $W_1$ of the L-shaped outer end portion 36 is equal to or less than the width $W_2$ of the housing 12 and in the preferred embodiment the width $W_1$ is substantially equal to the width $W_2$.

It is not particularly important what type of fastener 16 is utilized with the invention 10. However, what is termed a DZUS fastener that is commonly utilized in securing electronic equipment to racks and the like has been found to be quite satisfactory. However, it will be obvious that other types of fasteners used in the art can be substituted for a DZUS fastener. The fastener should however in the preferred embodiment have a body portion 58 which does not substantially have a length greater than the distance A illustrated in FIG. 2 which is the distance from the inner surface 60 of the leg portion 38 and the outer surface 62 of the leg portion 56. It will be noted from FIG. 2 that when the handle 14 is in its stowed position that the outer surface 64 of the fastener 16 does not protrude above the surface 62, the outer surface 66 of the portion 20 or the outer surface 44 of the housing 12. This is due to the proper selection of the distance A and/or the length of the body portion 58 of the fastener 16. This is desirable in order to eliminate any possible protrusion which could constitute a safety hazard or interfere with the movement of individuals within a confined space. It will be noted that the fastener 16 has a projecting engaging protrusion 68 which is utilized to secure the fastener 16 and the associated handle 12 to a suitable mounting rack or the like.

FIG. 3 illustrates the handle and fastening apparatus 10 is use mounted on the front panel 70 of electronic equipment. As illustrated, the handle and fastening apparatus is secured by suitable screws (not shown) to one corner of the front panel 70. It will be noted that the depth B of the housing 12 of the handle and fastening apparatus 10 should be substantially equal to the distance C which is the distance from the outer surface 72 of the electronic equipment panel to the outer surface 74 of the panel backing plate or flat member 76. This is desirable in order to eliminate any protrusion of any portion of the handle and fastening apparatus 10 above the outer surface 72 of the front panel 70 when the handle 14 is in the stowed position. It will be noted in FIG. 3 that since the protrusion 68 of the fastener 16 extends to the leg 38 and also the panel backing plate 76, it serves to secure the panel backing plate 76 and the associated front panel 70 to a rack or the like which has been omitted for clarity.

FIG. 4 illustrates the structure set forth in FIG. 3 when the handle 14 of the handle and fastening apparatus 10 is in its extended or operating position. It will be noted that the inner end portion 24 of the handle 14 pivots about the roll pin 22 when the handle 14 is rotated to its operative position. When the handle 14 is in its operative position, a person can readily grasp the rectangular shaped cross section portion 20 and the associated projections 48, 50 and 56 as well as portions of the fastener 16 in order to exert an outward force on the panel backing plate 76 and the associated front panel 70 so that the front panel 70 and associated electronic equipment (not shown) can be removed from an equipment rack or the like (not shown).

FIG. 5 illustrates two of the handle and fastening apparatus 10 in use in connection with the front panel 70 of electronic equipment. It will be noted that one of the handle and fastening apparatus 10 is secured to the backing plate 76 near the lower right hand corner of the backing plate and front panel combination, and that the other handle and fastening apparatus is secured to the backing plate 76 in the upper left hand corner of the backing plate 76 and front panel 70 combination. It has been determined that only two of such handle and fastening apparatus are necessary for most uses. However, it is obvious that other handle and fastening apparatus could be secured to the other portions of the backing plate 76 and front panel combination if desired.

FIG. 6 illustrates a structure set forth in FIG. 5 with the handles 14 of the handle and fastening apparatus 10 rotated into their outward or operative position. It will be noted that the upper handle and fastening apparatus 10 has been located and connected to the backing plate 76 so that the handle 14 rotates in a downward direction when it is moved into its operative position. Conversely the lower handle and fastening apparatus 10 has been located and connected to the backing plate 76 so that the handle 14 rotates upwardly when the handle is moved to its operative position. This location of the handle and fastening apparatus 10 has been proven to give the most satisfactory results. This is partly due to the fact that the fasteners 16 of the handle and fastening apparatus 10 are located towards the respective corners of the panel 76 when the handle 14 is in its stowed position and the fasteners securing the panel to a rack or the like (not shown).

The handle and fastening apparatus 10 is utilized in the following manner. Suitable holes (not shown) are drilled at appropriate locations in the backing plate 76 so that apertures 30 and 32 in the housing 12 can be secured to the backing plate 76 through the use of the apertures 30 and 32 and appropriate fasteners such as screws or the like. The electronic equipment which has the front panel 72 is then slid into its appropriate location in a rack or console. The handles 14 of the handle and fastening apparatus 10 can be utilized in assisting in this process. The handles 14 are then pivoted inwardly to the stowed position, and the fastener is twisted by the use of a screwdriver or the like (not shown) whose blade can be inserted into the slot 78 or the like of the fastener to twist it and secure the leg 38 and the panel 76 to the rack (not shown).

When it is desired to remove the electronic equipment and the associated front panel 70 from the rack, a suitable tool such as a screwdriver which is inserted into the slot and the fastener is utilized to turn the fastener to cause it to be rotated to its unlocked position. This is done for each of the fasteners 16. The handles 14 are then rotated to their outer extended positions and an individual grasps the handles and pulls the electronic equipment and the panel 70 outward to remove the electronic equipment for replacement or repair. The various components of the handle and fastening apparatus 10 can be made from a number of suitable materials. In practice a suitable type of steel has been utilized for the housing 12 and the handle 14. However, it will be appreciated that if a lightweight structure is desired that these components could be made from a suitable type of aluminum or other lightweight material.

Although the invention has been described in considerable detail with reference to certain preferred embodiments, it will be understood that variations or modifications may be made within the spirit and scope of the invention as defined in the appended claims.

What is claimed is:

1. Handle and fastening apparatus comprising a housing, a handle, said handle having a substantially L-shaped portion and an inner end portion, said handle having the inner end portion thereof rotatably connected to said housing to permit said handle to be pivoted from a stowed position to an operative extended position and the substantially L-shaped portion of said handle having portions thereof protruding outward away from the rest of said handle, and fastener means connected to one of the legs of the L-shaped outer end portion of said handle.

2. The handle and fastening apparatus of claim 1 wherein the width of the L-shaped outer portion of said handle is equal to or less than the width of said housing.

3. The handle and fastening apparatus of claim 2 wherein the width of the L-shaped outer portion of said handle is substantially equal to the width of said housing.

4. The handle and fastening apparatus of claim 3 further comprising a flat member and wherein said housing has means for securing said housing to said flat member.

5. The handle and fastening apparatus of claim 4 wherein said means for securing housing to said flat member comprises holes located in said housing.

* * * * *